Jan. 6, 1925.  1,522,334
T. J. SHANAHAN
DIFFERENTIAL CLUTCH
Filed March 28, 1921  2 Sheets-Sheet 2
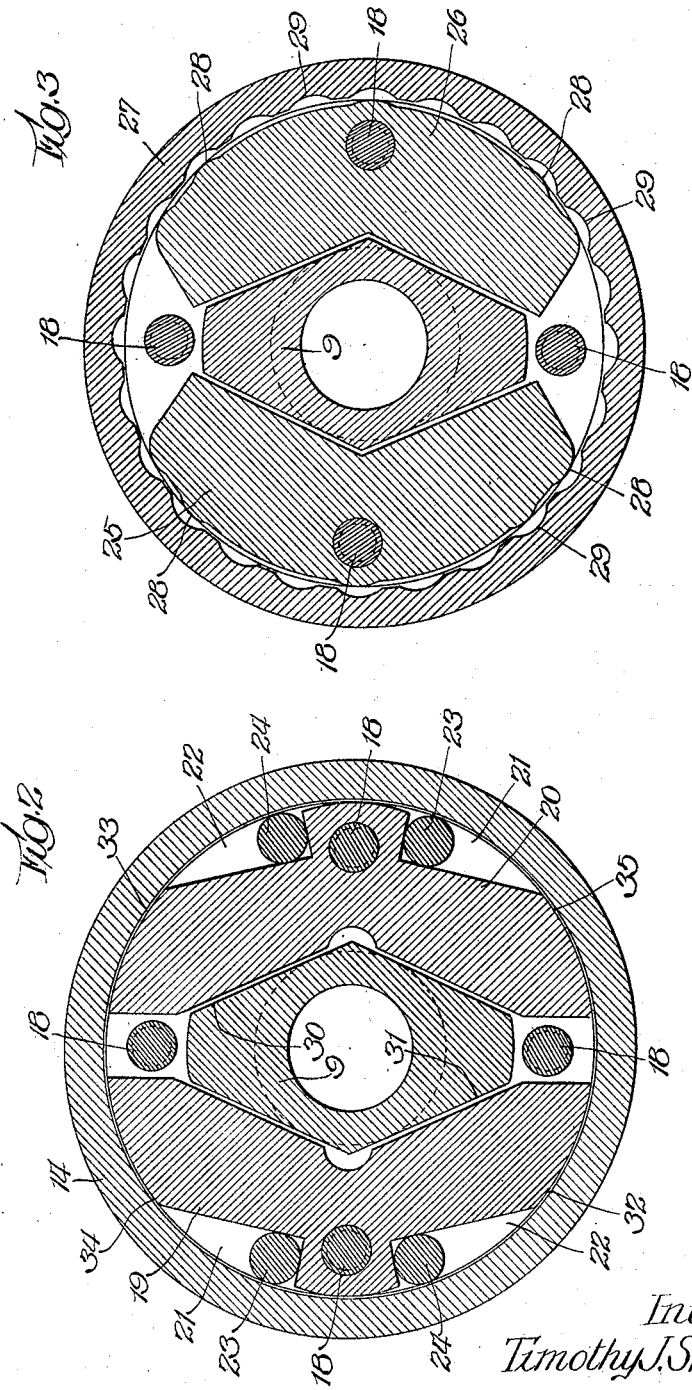
Inventor
Timothy J. Shanahan Patented Jan. 6, 1925.

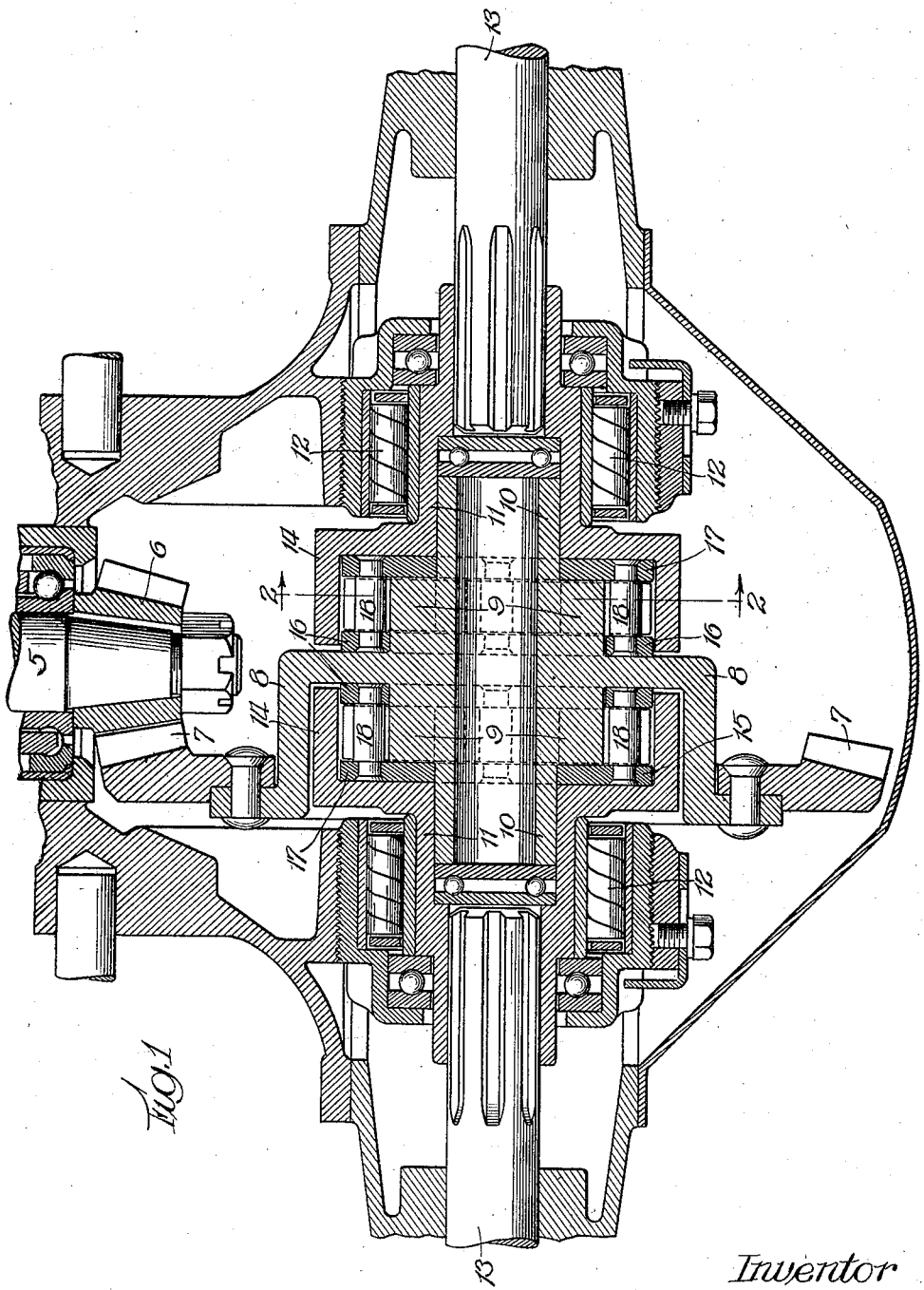

1,522,334

UNITED STATES PATENT OFFICE.

TIMOTHY J. SHANAHAN, OF BLUE ISLAND, ILLINOIS.

DIFFERENTIAL CLUTCH.

Application filed March 28, 1921. Serial No. 456,243.

*To all whom it may concern:*

Be it known that I, TIMOTHY J. SHANAHAN, a citizen of the United States, residing at Blue Island, in the county of Cook and State of Illinois, have invented certain new and useful Improvements in Differential Clutches, of which the following is a specification.

This invention relates to power transmitting mechanisms but more particularly to those of the differential or automatic clutch type.

The primary object of the invention is to insure transmission of power to both driving wheels of a motor driven vehicle. Motor vehicles equipped with the usual standard differential gearing are frequently stalled by mud, snow or ice because of poor traction conditions under a single wheel. The wheel meeting with the least resistance receives the entire power and will spin while the other driving wheel having adequate traction is inactive because no power is transmitted to it. If power under these conditions were delivered to the wheel having the better traction, the vehicle could be moved. To eliminate as far as possible this trouble, various forms of direct driving mechanisms for the individual wheels have been developed but these require a complete rearrangement of the transmission systems in cars of the present type and very materially increase the cost of production and the weight of the car. The mechanism forming the present invention will transmit power to both wheels at all times with the exception that no power will be delivered to a wheel rotating faster than the driving member. It will therefore be readily evident that either wheel may run ahead of the driving member but neither may lag behind such member. Where one wheel is meeting with traction resistance and the other is not, the power will then be delivered to both wheels in proportion to their resistance. The construction of the mechanism is such that it may be used with the standard axle.

Another important object of the invention is to prevent skidding resulting from one wheel lagging behind the driving mechanism.

Further objects are to eliminate the need for brake equalizers, to insure the automatic engagement and release of the driving elements at the proper time, and in general to provide a simplified and improved differential construction.

The many other objects and advantages of the invention will be better understood by reference to the following specification when considered in connection with the accompanying drawings illustrating certain selected embodiments thereof, in which:—

Fig. 1 is a central vertical section of a differential embodying the invention complete.

Fig. 2 is a transverse section on the line 2—2 of Fig. 1, and

Fig. 3 is a similar section of a modified form of the invention.

Referring to the drawings, power is transmitted from the engine by the usual driving shaft 5 which is provided at its outer extremity with a bevel gear 6 meshing with a ring gear 7 secured upon the central driving disk 8. This disk is provided with cam blocks 9 projecting from opposite faces thereof and preferably integral with the disk. Cylindrical extensions 10 of these blocks fit within corresponding driven members 11 to form bearings for the disk. The driven members fit within the usual roller bearings 12 and are splined upon the inner end of their respective axle shafts 13. The inner portion of each of the driven members 11 forms a drum 14.

A cage 15 envelops each of the blocks 9 and is supported by the disk 8. Each of these cages consists of spaced rings 16 and 17 secured together by shouldered pins 18. The ring 16 fits over the block 9 and the ring 17 fits over the extension 10 in a similar manner. Blocks 19 and 20 are pivotally mounted upon pins 18 on opposite sides of each of the cam blocks 9. Depressions 21 and 22 are formed in the outer face of the blocks 19 and 20 and hardened rollers 23 and 24 rest within these depressions. These depressions are so formed that the rollers in the inoperative position indicated in the drawings cannot simultaneously contact with the bottom of the depressions and the inner face of the drum 14.

The cage is free to revolve about the driving member on which it is mounted, and within the driven member. The relative rotation of the cages and the driving member is limited by the amount of clearance between the inner faces of the blocks 19 and 20 and the cam block 9.

A modified form of the invention is shown in Fig. 3 of the drawings in which the blocks 25 and 26 corresponding to the blocks 19 and 20 of the previous embodiment are not provided with binding rollers but depend wholly upon the interengagement of the outer faces of the blocks with the inner face of the drum 27. When the differential is to be used on heavy draft vehicles, bosses 28 may be formed on the outer face of the blocks 25 and 26 to enter corresponding depressions 29 on the inner face of the drum. The drum engaging blocks in any of the forms of the invention may be covered on their outer surfaces with any suitable friction material such as that used in lining brake bands.

In the operation of the device the main driving shaft 5 is connected to the engine in the usual manner to provide both forward and reverse drive. Rotation of this shaft will cause a corresponding revolution of the driving disk 8 and the cam blocks 9 formed thereon or attached thereto. Viewing the structure as shown in Fig. 2, rotation of the cam block 9 in a clockwise direction will cause the faces 30 and 31 of this block to move into contact with the opposing faces of the blocks 19 and 20 and to rotate these blocks upon their respective pivots likewise in a clockwise direction. The rotation of these blocks 19 and 20 in this manner causes the outer faces 32 and 33 respectively of these blocks to be forced into frictional engagement with the inner face of the drum 14. Simultaneously with the moving of the block faces into contact with the drum, the rollers 24 are engaged by the drum and a counter-clockwise rotation of these rollers takes place which gradually forces the rollers into the narrow portion of the depression. The binding action increases until the driving and driven elements are rigidly locked together. A similar action takes place when the cam block is rotated in a counter-clockwise direction, the binding action then taking place through the faces 34 and 35 of the blocks 19 and 20 respectively and through the rollers 23.

When either wheel at any time tends to rotate faster than the driving member, the drum connected to the axle shaft of this wheel will cause the blocks engaging it to be rocked upon their pivots in the opposite direction to that in which they were moved to provide the initial locking. This counter-rotation will only continue until the blocks strike the reverse face of the cam block. The rollers are then forced by the relative movement of the drum and blocks into the deep portion of the depressions and the blocks and rollers will assume the positions indicated in Fig. 2 of the drawings. This disengagement will continue until the speed of the wheel tends to fall below that of the driving member. At this point the blocks will again be automatically forced into locking engagement and the wheel will be driven by the driving member.

It is therefore evident that both driving wheels must rotate as rapidly as the driving member but either or both may at any time rotate at a higher speed. If one wheel is not offering any resistance to the driving member for any reason, the power of the engine will be exerted through the other wheel. Thus when one wheel is operating upon a slippery surface and the other wheel is upon firm ground, the power will be transmitted to the latter, whereas with the ordinary differential gearing it would be conveyed to the former where it can perform little or no service. In turning a corner the power is transmitted to the inside driving wheel and the outside wheel runs free. As soon as the turn is completed, the free wheel will automatically engage and the driving action will take place through both wheels.

Brake action applied to either wheel will be transmitted to the driving member and the vehicle may be brought safely to a stop without the application of any braking action on the other wheel. This eliminates the necessity for brake equalizers.

With the ordinary differential gearing skidding of the vehicle occurs frequently on account of the lagging of one wheel and the accompanying increase in power applied to the other wheel. This is impossible with the present invention as neither wheel may lag behind the driving member and the power is exerted upon the slower turning wheel rather than upon the faster.

The control of the blocks by the cage insures release of the drums at the proper times and absolutely prevents improper engagement.

The present construction is much more simple than the ordinary type of differential gearing and the action is more smooth.

The term "cage" is used to define a construction comprising oppositely disposed side members or rings connected by cross members, as distinguished from mere separate rings.

I am aware that many changes may be made in the form and arrangement of the various parts without departing from the spirit of my invention and I reserve the right to make all such as fairly fall within the scope of the following claims.

I claim:

1. A device of the class described, comprising a revoluble driving disk, a revoluble driven drum, a cam formed on said disk, a cage mounted on said cam, blocks pivotally mounted in said cage and movable by said cam toward said drum, and rollers seated in the outer face of each of said blocks adapted to frictionally lock said drum to said disk when said blocks are moved toward said drum by said cam.

2. A device of the class described, comprising a revoluble driving member, a revoluble driven member, a cage mounted on said driving member and revoluble therewith, a block interposed between said members, a roller seated in the outer face of said block, and means on said driving member for moving said block and said roller into frictional engagement with said driven member to lock said members together when said driving member is rotating more rapidly than said driven member.

3. A device of the class described, comprising a revoluble driving member, a revoluble driven member, a cage mounted on said driving member and revoluble therewith, a block interposed between said members, a pair of rollers seated in the outer face of said block, and means on said driving member for shifting said block relative to said driven member to bring one of said rollers into frictional engagement with said driven member and lock said members together when said driving member is rotating more rapidly than said driven member.

4. A device of the class described, comprising a revoluble driving member, a revoluble driven member, a cage mounted on said driven member and revoluble therewith, a block pivotally mounted intermediate its ends in said cage and having depressions in its outer face on opposite sides of the pivotal connection to receive rollers, a roller in each of said depressions, and means on said driving member for moving said block toward said driven member to bring one of said rollers into engagement with said driven member and cause said members to be locked together while said driving member is rotating more rapidly than said driven member.

TIMOTHY J. SHANAHAN.